(12) United States Patent
Chung (10) Patent No.: US 10,249,931 B2
(45) Date of Patent: Apr. 2, 2019

(54) ANTENNA MODULE AND WIRELESS CONTROL SYSTEM INCLUDING THE SAME

(71) Applicant: LG INNOTEK CO., LTD., Seoul (KR)

(72) Inventor: Won Suk Chung, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 546 days.

(21) Appl. No.: 14/823,067

(22) Filed: Aug. 11, 2015

(65) Prior Publication Data

US 2016/0049725 A1    Feb. 18, 2016

(30) Foreign Application Priority Data

Aug. 18, 2014  (KR) ................ 10-2014-0107077

(51) Int. Cl.

| H01Q 1/52 | (2006.01) |
|---|---|
| H01Q 1/00 | (2006.01) |
| H01Q 25/00 | (2006.01) |
| H04B 7/14 | (2006.01) |
| H01Q 1/36 | (2006.01) |

(52) U.S. Cl.
CPC ........... *H01Q 1/007* (2013.01); *H01Q 25/005* (2013.01); *H04B 7/14* (2013.01); *H01Q 1/362* (2013.01)

(58) Field of Classification Search
CPC .... H01Q 1/007; H01Q 25/007; H01Q 25/005; H01Q 1/362; H04B 7/14
See application file for complete search history.

(56) References Cited

U.S. PATENT DOCUMENTS

| 4,977,406 | A | * | 12/1990 | Tsukamoto | ........ H01Q 21/0081 343/700 MS |
|---|---|---|---|---|---|
| 5,371,322 | A | * | 12/1994 | Selmeski | ............... H01R 4/723 174/75 C |
| 5,625,883 | A | * | 4/1997 | Leyten | ..................... H04B 1/20 336/232 |
| 6,025,816 | A | * | 2/2000 | Dent | ..................... H01Q 1/084 343/700 MS |
| 6,118,408 | A | | 9/2000 | Yang et al. | |
| 2004/0066326 | A1 | * | 4/2004 | Knapp | ................. H01Q 1/1285 342/350 |

(Continued)

FOREIGN PATENT DOCUMENTS

| CN | 1411637 A | 4/2003 |
|---|---|---|
| CN | 1599280 A | 3/2005 |

(Continued)

OTHER PUBLICATIONS

Office Action dated Oct. 17, 2017 in Chinese Application No. 201510507837.X, along with its English Translation.

*Primary Examiner* — Dameon E Levi
*Assistant Examiner* — David E Lotter
(74) *Attorney, Agent, or Firm* — Saliwanchik, Lloyd and Eisenschenk (57) ABSTRACT

An antenna module according to an embodiment of the invention includes a first antenna unit, a second antenna unit symmetrically disposed to the first antenna unit with a wall interposed therebetween, and an antenna connection unit which connects the first antenna unit and the second antenna unit.

8 Claims, 6 Drawing Sheets

(56) References Cited

U.S. PATENT DOCUMENTS

| | | | |
|---|---|---|---|
| 2004/0110469 A1* | 6/2004 | Judd | G01S 19/25 455/15 |
| 2004/0125024 A1* | 7/2004 | Kim | H01Q 1/007 343/700 MS |
| 2008/0316101 A1* | 12/2008 | Brown | H01Q 21/0025 342/374 |
| 2009/0079654 A1* | 3/2009 | Higaki | H01Q 9/28 343/795 |
| 2015/0108901 A1* | 4/2015 | Greene | H05B 37/0218 315/149 |

FOREIGN PATENT DOCUMENTS

| | | |
|---|---|---|
| CN | 1734834 A | 2/2006 |
| CN | 101553956 A | 10/2009 |
| CN | 202261289 U | 5/2012 |

* cited by examiner

TRAVELING DIRECTION OF WAVE

ANTENNA MODULE AND WIRELESS CONTROL SYSTEM INCLUDING THE SAME

CROSS-REFERENCE TO RELATED APPLICATION

This application claims the benefit under 35 U.S.C. § 119 of Korean Patent Application No. 10-2014-0107077, filed Aug. 18, 2014, which is hereby incorporated by reference in its entirety.

BACKGROUND

Field of the Invention

The present invention relates to an antenna module and a wireless control system including the same.

Discussion of Related Art

With the development of home network technologies, there is a request for wireless control of indoor lighting, air conditioning or the like. It is possible to wirelessly control the indoor lighting, the air conditioning or the like using access points installed in a house.

Figure 1:
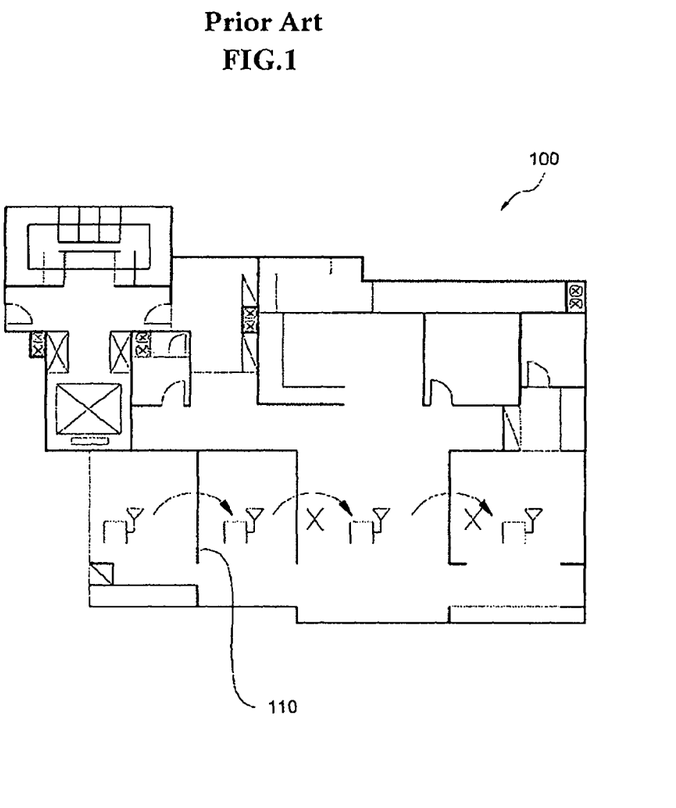
FIG. 1 is a an example of a cross-sectional view of an apartment.
Figure 2:
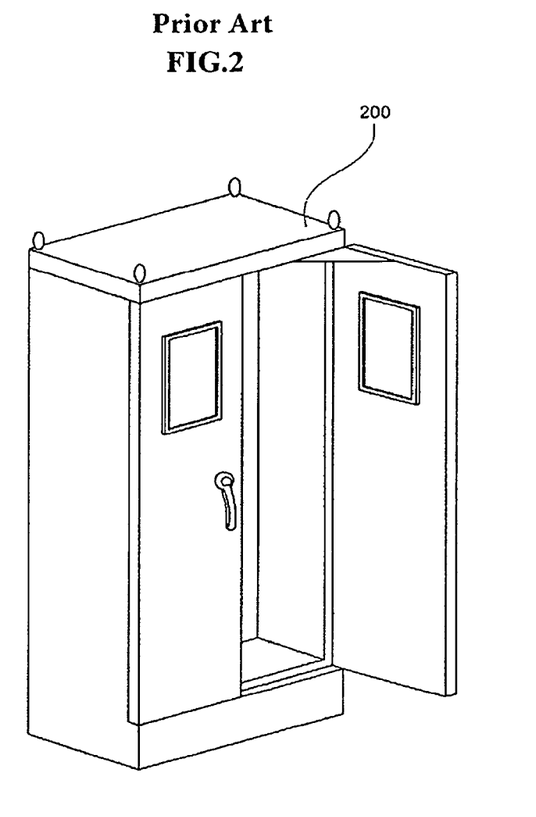
FIG. 2 is an example of a steel box in which a switchboard or an air-conditioner is housed.

However, as illustrated in FIG. 1, a room, a living room, a kitchen and the like are partitioned by concrete walls (110) in a house (100), and as illustrated in FIG. 2, a switchboard for supplying power to lighting devices or air conditioners for providing cooling and heating are housed in an steel box (200) or are embedded within the concrete walls. When radio frequency signals transmitted from a wireless communication device passes through the concrete walls or the steel box, the loss of the radio frequency signals may be generated. Therefore, a large number of access points are required for wireless control in the house, and it is difficult to wirelessly control the switchboard or the air-conditioner.

Therefore, there is a need for a device that minimizes the number of access points installed in the house for wireless control and wirelessly controls a switchboard and the air-conditioner.

BRIEF SUMMARY

The present invention is directed to an antenna module and a wireless control system.

According to an aspect of the present invention, there is provided an antenna module including: a first antenna unit, a second antenna unit that is symmetrically disposed to the first antenna unit with a wall interposed therebetween, and an antenna connection unit which connects the first antenna unit and the second antenna unit.

Each of the first antenna unit and the second antenna unit may include a reflection plate, and a directional antenna disposed on the reflection plate.

Each of the first antenna unit and the second antenna unit may further include a cover that covers the reflection plate and the directional antenna.

The antenna connection unit may include an antenna line and a sheath which surrounds the antenna line.

An insulating layer may be formed between the antenna line and the sheath.

Each of the first antenna unit and the second antenna unit may be connected to the antenna connection unit through a first coupler and a second coupler.

Each of the first coupler and the second coupler may include a female section connected to the antenna connection unit, and a male section connected to the first antenna unit and the second antenna unit, and the female section and the male section may be coupled by being engaged with each other.

Each of the first coupler and the second coupler may include a male section connected to the antenna connection unit, and a female section connected to the first antenna unit and the second antenna unit, and the female section and the male section may be coupled by being engaged with each other.

Each of the first coupler and the second coupler may be connected to a ground, and the first coupler and the second coupler may be connected to each other.

When one of the first antenna unit and the second the antenna unit is a reception antenna, the other may be a transmission antenna.

The antenna connection unit may penetrate the wall.

According to another aspect of the present invention, there is provided a wireless control system including: a first antenna module which includes a first reception antenna unit, a first transmission antenna unit symmetrically disposed to the first reception antenna unit with a wall interposed therebetween, and a first antenna connection unit configured to connect the first reception antenna unit with the first transmission antenna unit; and a second antenna module which includes a second reception antenna unit, a second transmission antenna unit symmetrically disposed to the second reception antenna unit with a wall interposed therebetween, and a second antenna connection unit configured to connect the second reception antenna unit with the second transmission antenna unit, wherein a signal received by the first reception antenna unit is transmitted to the first transmission antenna unit through the first antenna connection unit, a signal transmitted to the first transmission antenna unit is received by the second reception antenna unit, and a signal received by the second reception antenna unit is transmitted to the second transmission antenna unit through the second antenna connection unit.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which.

DETAILED DESCRIPTION OF EXEMPLARY EMBODIMENTS

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention.

Although terms including ordinal numbers such as first and second may be used to describe various components, the components are not limited by the terms. The terms are used only to distinguish one component from other components. For example, a second component may be called a first component without departing from the scope of the present invention, and similarly, the first component may also be called a second component. The term "and/or" includes combination of a plurality of associated listed items or any item of the plurality of associated listed items.

When a component is described as being "linked" or "connected" to another component, a component may be directly linked or connected to another component, it should be understood, however, that another component may be present in the middle. Meanwhile, when a component is described as being "directly linked" or "directly connected" to another component, it should be understood that another component may not be present in the middle.

The terms used herein are used to simply describe particular embodiments but are not intended to limit the present invention. Singular expressions include plural expressions, unless the context otherwise requires. It should be understood that, in this application, terms such as "comprises" or "has" specify the presence of features, numbers, steps, operations, constituent elements and components described in the specification or combinations thereof, but do not preclude one or more other features or the presence or additional capability of features, numbers, steps, operations, components or combinations thereof.

Unless otherwise defined, all terms, including technical or scientific terms used herein, have the same meanings as those generally understood by a person with ordinary skill in the art to which the present invention pertains. The commonly used terms, such as those defined in a dictionary, should be interpreted as having the meanings consistent with the contextual meanings of the relevant art, and unless clearly defined in this application, the terms are not interpreted as ideally or excessively formal meanings.

Hereinafter, the embodiments will be described in detail with reference to the accompanying drawings, the same or corresponding components are denoted by the same reference numbers regardless of reference numerals, and the repeated description thereof will not be provided.

Figure 3:
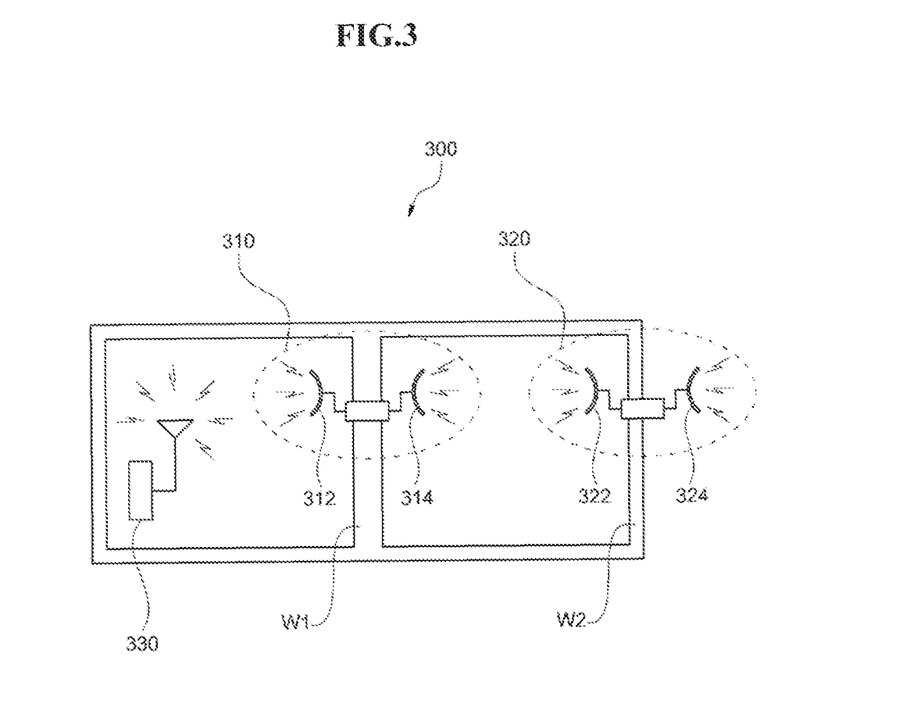
FIG. 3 illustrates a wireless control system according to an embodiment of the present invention.

FIG. 3 illustrates a wireless control system according to an embodiment of the present invention.

Referring to FIG. 3, a wireless control system 300 includes a plurality of antenna modules 310 and 320, and each of the antenna modules 310 and 320 penetrates walls W1 and W2.

Each of the antenna modules 310 and 320 respectively includes reception antenna units 312 and 322 and transmission antenna units 314 and 324, and the reception antenna units and the transmission antenna units included in each antenna module are disposed with the wall interposed therebetween. Therefore, the signal transmitted from the reception antenna unit 312 of one antenna module 310 may be transmitted to the reception antenna unit 322 of another antenna module 320 through the transmission antenna unit 314.

In this way, according to the wireless control system according to the embodiment of the present invention, even when there are obstacles such as a concrete wall or a steel box, it is possible to minimize the loss of the radio frequency signal transmitted from the wireless communication device 330.

An antenna module according to an embodiment of the present invention will be described with reference to the drawings below in detail.

Figure 4:
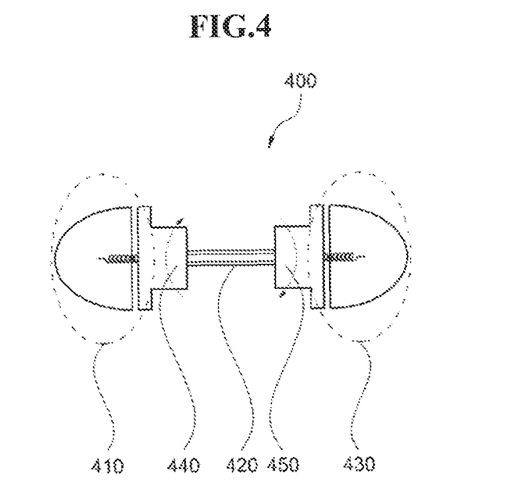
FIGS. 4 and 5 illustrate an antenna module according to an embodiment of the present invention.
Figure 5:
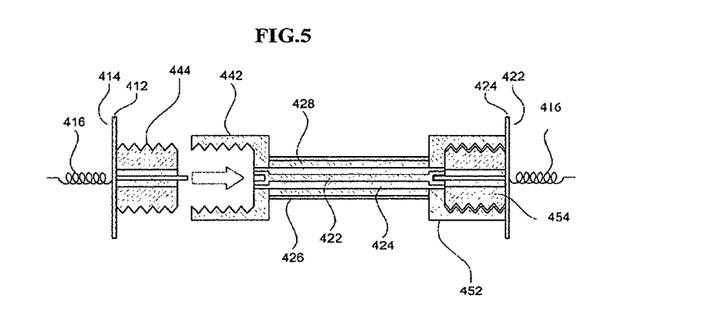
Figure 6:
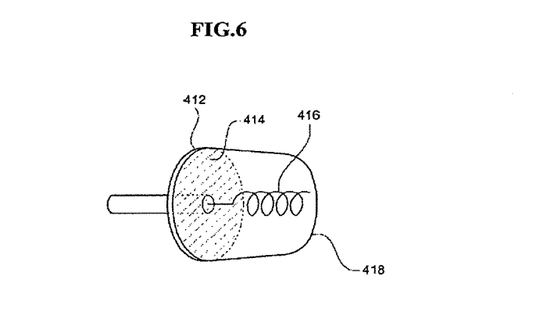
FIGS. 6 and 7 illustrate an antenna unit of the antenna module according to the embodiment of the present invention.
Figure 7:
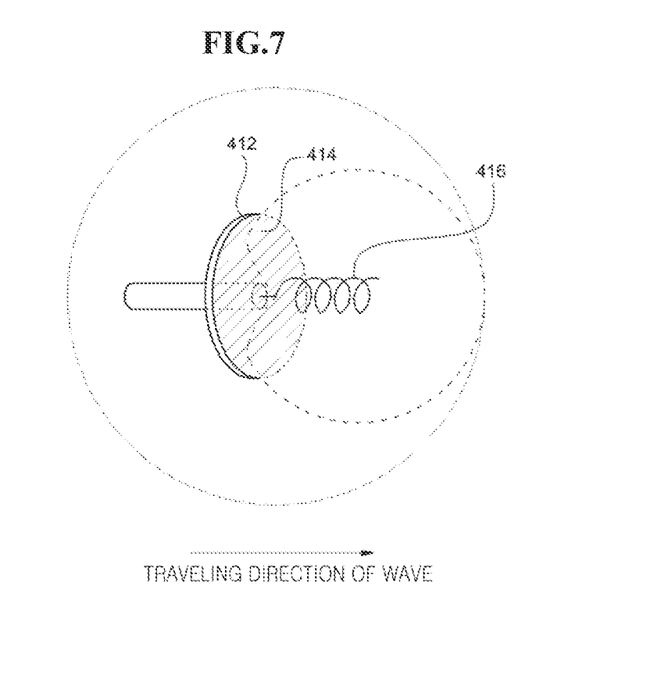

FIGS. 4 and 5 illustrate the antenna module according to an embodiment of the present invention, and FIGS. 6 and 7 illustrate the antenna unit of the antenna module according to the embodiment of the present invention.

Referring to FIGS. 4 to 7, an antenna module 400 according to the embodiment of the present invention includes a first antenna unit 410, an antenna connection unit 420 and a second antenna unit 430.

The first antenna unit 410 and the second antenna unit 430 are symmetrically disposed to each other with the wall interposed therebetween. The antenna connection unit 420 connects the first antenna unit 410 with the second antenna unit 430. To this end, the antenna connection unit 420 may penetrate the walls. Here, the walls, for example, may be concrete walls, wooden walls, iron walls or the like. In this specification, the walls mean structures that are spatially separated, and may be used as terms that include an obstacle and a steel box through which the radio frequency signal is hard to penetrate, as well as vertical structures which block the perimeter of a house and a room.

When one of the first antenna unit 410 and the second antenna unit 430 is a reception antenna, the other may be a transmission antenna. For example, when the radio frequency (RF) is received through one of the first antenna unit 410 and the second antenna unit 430, that is, the reception antenna, the RF signal is transmitted to the other antenna unit, that is, the transmission antenna through the antenna connection unit 420. Therefore, even when there is an obstacle such as a wall between the first antenna unit 410 and the second antenna unit 430, a radio frequency signal may be transmitted while minimizing the loss.

At this time, as illustrated in FIGS. 6 and 7, the first antenna unit 410 includes a ground 412, a reflection plate 414, a directional antenna 416 and a cover 418. The reflection plate 414 may be disposed on the ground 412, and the directional antenna 416 may be disposed on the reflection plate 414. The cover 418 may cover the reflection plate 414 and the directional antenna 416. Here, the directional antenna 416 may be a spiral feeder. The frequency range of the directional antenna 416 may be differently designed depending on the application. For example, it is possible to set the directional antenna 416 so that an average gain of the first antenna unit 410 is 3 dBi or more, a voltage standing wave ratio (VSWR) is 2:1 or less, and a magnitude is −10 dBm or less. Here, although the first antenna unit 410 is described as an example, the second antenna unit 430 may also have the same structure as the first antenna unit 410.

In this way, when the first antenna unit 410 and the second antenna unit 430 include the directional antenna, since the RF signal propagated from the directional antenna has directivity in a travelling direction of the wave, it is possible to improve the transceiving efficiency of the signal.

The reflection plate 414 may contain a metal.

Meanwhile, the antenna connection unit 420 passes through obstacles such as walls. To this end, holes for allowing the antenna connection unit 420 to pass may be formed in the walls and the like.

The antenna connection unit 420 may include an antenna line 422, an insulating layer 424 and a sheath 426. The sheath 426 surrounds the antenna line 422, and an insulating layer 424 may be formed between the antenna line 422 and sheath 426. One end of the antenna line 422 may be connected to the directional antenna of the first antenna unit 410, and the other end may be connected to the directional antenna of the second antenna unit 430. Therefore, since the signal received by one antenna unit of the first antenna unit 410 and the second antenna unit 430 may be transmitted to the other antenna unit through the antenna line 422 of the antenna connection unit 420, it is possible to reduce the loss of signal due to obstacles such as walls. Meanwhile, the antenna connection unit 420 may be fitted to the holes formed on a wall or the like, and to this end, the sheath 426 of the antenna connection unit 420 may have elasticity.

To this end, the first antenna unit 410 is connected to one end of the antenna connection unit 420 through a first coupler 440, and the second antenna unit 430 may be connected to the other end of the antenna connection unit 420 through a second coupler 450. That is, each of the first antenna unit 410, the antenna connection unit 420 and the second antenna unit 430 may be separated from each other, and after one end of the antenna connection unit 420 penetrates the holes formed on the walls or the like, they may be connected to each other through the first coupler 440 and the second coupler 450.

Each of the first coupler 440 and the second coupler 450 has a female section and a male section, and the female section and the male section may be coupled by being engaged with each other. FIG. 5 illustrates that the first coupler 440 includes a female section 442 connected to one end of the antenna connection unit 420, and a male section 444 connected to the first antenna unit 410, and the second coupler 450 includes a female section 452 connected to the other end of the antenna connection unit 420, and a male section 454 connected to the second antenna unit 430, but it is not limited thereto. The first coupler 440 includes a male section connected to one end of the antenna connection unit 420, and a female section connected to the first antenna unit 410, and the second coupler 450 may also include a male section connected to the other end of the antenna connection unit 420, and a female section connected to the second antenna unit 430.

At this time, each of the first coupler 440 and the second coupler 450 is connected to the grounds of the first antenna unit 410 and the second antenna unit 430, and the first coupler 440 and the second coupler 450 may be connected to each other through the antenna connection unit 420. To this end, the antenna connection unit 420 may further include a ground layer 428 disposed between the insulating layer 424 and the sheath 426.

Hereinafter, the RF signal transmission performance of the antenna module according to the embodiment of the present invention will be described through the experiment below.

Figure 8:
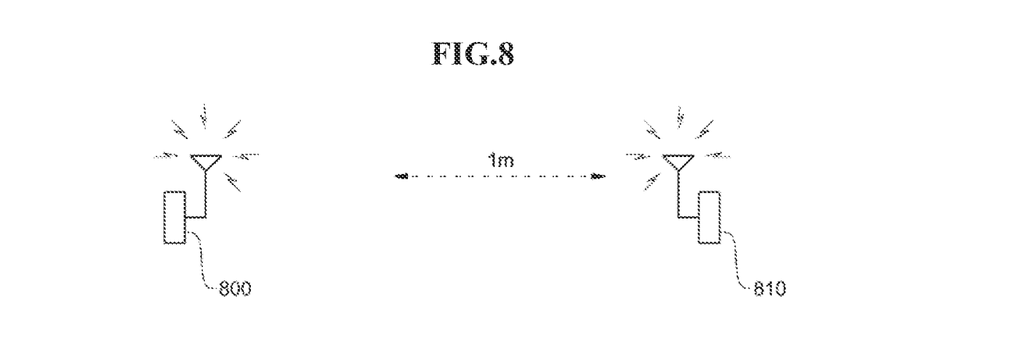
FIGS. 8 to 10 are diagrams illustrating the experiment of an RF signal transmission performance of the antenna module according to the embodiment of the present invention.
Figure 9:
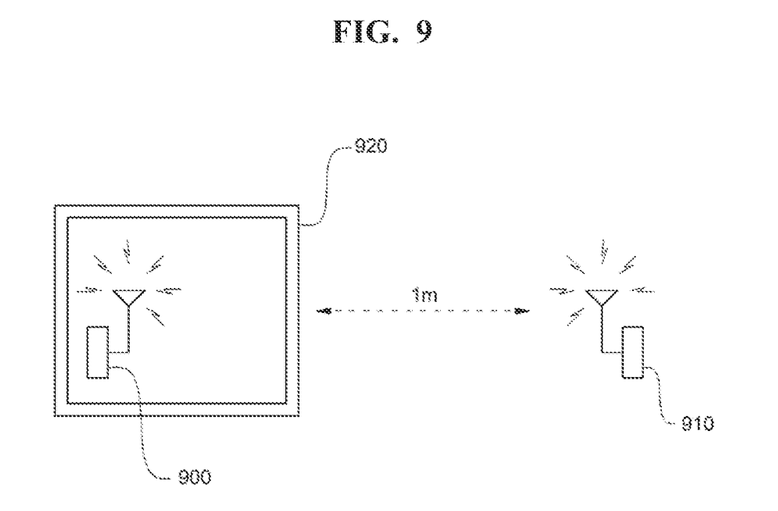
Figure 10:
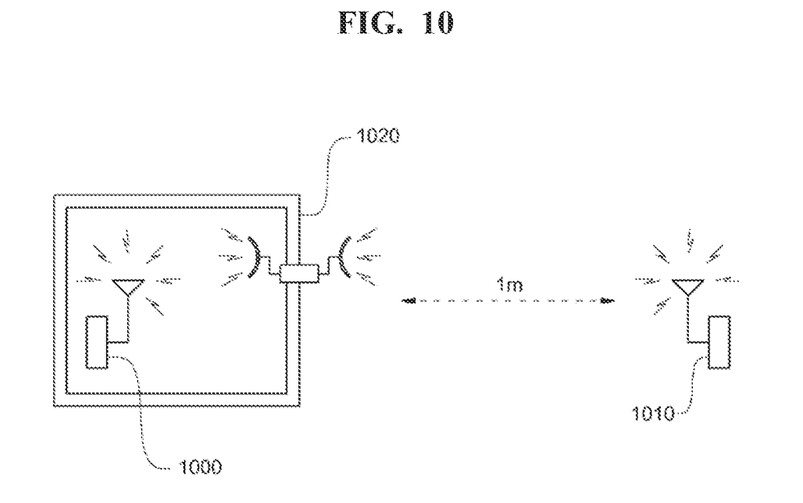

When there is no obstacle between a transmission antenna 800 and a reception antennas 810 (FIG. 8, Comparative Example 1), a transmission antenna 900 is disposed inside a shield box 920, when a reception antenna 910 is disposed outside the shield box 920 (FIG. 9, Comparative Example 2), a transmission antenna 1000 is disposed inside the shield box 1020, and a reception antenna 1010 is disposed outside the shield box 1020. However, each of the transmission and reception performances of the RF signal was measured when the antenna module 1030 according to an embodiment of the present invention penetrates the wall of the shield box (FIG. 10, Example 1).

When a distance between the transmission antenna and the reception antenna is 1 m and the transmission power of the transmission antennas is 10 dBm, the reception power of the reception antenna was measured. Table 1 illustrates the measured results of the reception power of the comparative examples and the example.

TABLE 1

| Number of experiment | Reception power |
|---|---|
| Comparative Example 1 | −12 dBm |
| Comparative Example 2 | −59 dBm |
| Example 1 | −29 dBm |

Referring to Table 1, in Comparative Example 1 in which there is no obstacle between the reception antenna and the transmission antenna, the reception power was −12 dBm, but in Comparative Example 2 in which the reception antenna is disposed inside the shield box, the reception power was −59 dBm. Therefore, it is possible to know that the transmission and reception quality of the RF signal is remarkably lowered due to an obstacle such as a shield box.

However, as in Example 1, when the antenna module according to the embodiment of the present invention is installed on the wall of the shield box, it is possible to know that the reception power is −29 dBm. That is, even when there is an obstacle between the transmission antenna and the reception antenna, when using the antenna module according to the embodiment of the present invention, it is possible to avoid the problem that the transceiving quality of the RF signal is lowered.

While the description has been provided with reference to the preferred embodiment of the present invention, it will be apparent to those skilled in the art that various modifications can be made to the above-described exemplary embodiments of the present invention without departing from the spirit or scope of the invention.

According to the embodiment of the present invention, it is possible to minimize a loss even when a radio frequency signal passes through obstacles such as walls. Therefore, since it is possible to maintain the quality of the signal even if there are obstacles such as walls, it is easy to perform the wireless control in a house without increasing the number of the access points.

What is claimed is:
1. An antenna module comprising:
a first antenna unit;
a second antenna unit, the second antenna unit and the first antenna unit being symmetrically disposed with respect to a wall interposed therebetween; and
an antenna connection unit that penetrates the wall, is fitted to a hole formed on the wall and connects the first antenna unit with the second antenna unit,
wherein the first antenna unit is connected to one end of the antenna connection unit through a first coupler, and the second antenna unit is connected to the other end of the antenna connection unit through a second coupler;
wherein the antenna connection unit comprises an antenna line, an insulating layer that surrounds the antenna line, a ground layer that surrounds the insulating layer, and a sheath that surrounds the ground layer;
wherein each of the first antenna unit and the second antenna unit includes a ground, a reflection plate disposed on the ground and an antenna disposed on the reflection plate,
wherein each of the first coupler and the second coupler includes a female section and a male section, and the female section and the male section are coupled by being engaged with each other, wherein one of the female section and the male section in each of the first coupler and the second coupler is connected to the ground in each of the first antenna unit and the second antenna unit, respectively, and wherein the other of the female section and the male section in each of the first coupler and the second coupler is connected to the ground layer in the antenna connection unit.

2. The antenna module of claim 1, wherein each of the antennas of the first and second antenna units comprises a directional antenna.

3. The antenna module of claim 1, wherein each of the first antenna unit and the second antenna unit further comprises a cover that covers the reflection plate and the antenna.

4. The antenna module of claim 1, wherein each of the first coupler and the second coupler comprises the female section connected to the antenna connection unit, and the male section connected to the first antenna unit and the second antenna unit.

5. The antenna module of claim 1, wherein each of the first coupler and the second coupler comprises the male section connected to the antenna connection unit, and the female section connected to the first antenna unit.

6. The antenna module of claim 1, wherein one of the first antenna unit and the second the antenna unit is a reception antenna and the other is a transmission antenna.

7. A wireless control system comprising:
a first antenna module including a first reception antenna unit and a first transmission antenna unit, the first reception antenna unit and the first transmission antenna unit being symmetrically disposed with respect to a first wall interposed therebetween, and a first antenna connection unit configured to connect the first reception antenna unit with the first transmission antenna unit; and
a second antenna module including a second reception antenna unit and a second transmission antenna unit, the second reception antenna and the second transmission antenna unit being symmetrically disposed with respect to a second wall interposed therebetween, and a second antenna connection unit configured to connect the second reception antenna unit with the second transmission antenna unit;
wherein the first antenna connection unit and the second antenna connection unit penetrate the first wall and the second wall, respectively, and the first antenna connection unit and the second antenna connection unit each is fitted to a hole formed on the corresponding wall,
wherein a signal received by the first reception antenna unit is transmitted to the first transmission antenna unit through the first antenna connection unit, a signal transmitted to the first transmission antenna unit is received by the second reception antenna unit, and a signal received by the second reception antenna unit is transmitted to the second transmission antenna unit through the second antenna connection unit;
wherein the first reception antenna unit is connected to one end of the first antenna connection unit through a first coupler, and the first transmission antenna unit is connected to the other end of the first antenna connection unit through a second coupler;
wherein the first antenna connection unit comprises an antenna line, an insulating layer that surrounds the antenna line, a ground layer that surrounds the insulating layer, and a sheath that surrounds the ground layer;
wherein each of the first reception antenna unit and the first transmission antenna unit includes a ground, a reflection plate disposed on the ground and an antenna disposed on the reflection plate,
wherein each of the first coupler and the second coupler includes a female section and a male section, and the female section and the male section are coupled by being engaged with each other,
wherein one of the female section and the male section in each of the first coupler and the second coupler is connected to the ground in each of the first reception antenna unit and the first transmission antenna unit, respectively, and
wherein the other of the female section and the male section in each of the first coupler and the second coupler is connected to the ground layer in the first antenna connection unit.

8. A wireless control system comprising:
a plurality of antenna modules each including a reception antenna unit, a transmission antenna unit, the reception antenna unit and the transmission antenna unit being symmetrically disposed with respect to a wall interposed therebetween, and an antenna connection unit connecting the reception antenna unit with the transmission antenna unit; and
a wireless communication device that transmits a radio frequency signal;
wherein the antenna connection unit penetrates the wall and is fitted to a hole formed on the wall,
wherein the reception antenna unit of at least one antenna module of the plurality of antenna modules is disposed within a same space as that of the wireless communication device, and the remaining antenna modules are disposed outside the space in which the wireless communication device is disposed;
wherein the reception antenna unit is connected to one end of the antenna connection unit through a first coupler, and the transmission antenna unit is connected to the other end of the antenna connection unit through a second coupler;
wherein the antenna connection unit comprises an antenna line, an insulating layer that surrounds the antenna line, a ground layer that surrounds the insulating layer, and a sheath that surrounds the ground layer,
wherein each of the reception antenna unit and the transmission antenna unit includes a ground, a reflection plate disposed on the ground and an antenna disposed on the reflection plate,
wherein each of the first coupler and the second coupler includes a female section and a male section, and the female section and the male section are coupled by being engaged with each other,
wherein one of the female section and the male section in each of the first coupler and the second coupler is connected to the ground in each of the reception antenna unit and the transmission antenna unit, respectively, and
wherein the other of the female section and the male section in each of the first coupler and the second coupler is connected to the ground layer in the first antenna connection unit.

* * * * *